Jan. 8, 1935.  J. R. McVEIGH  1,987,303
ENGINE
Filed June 1, 1931
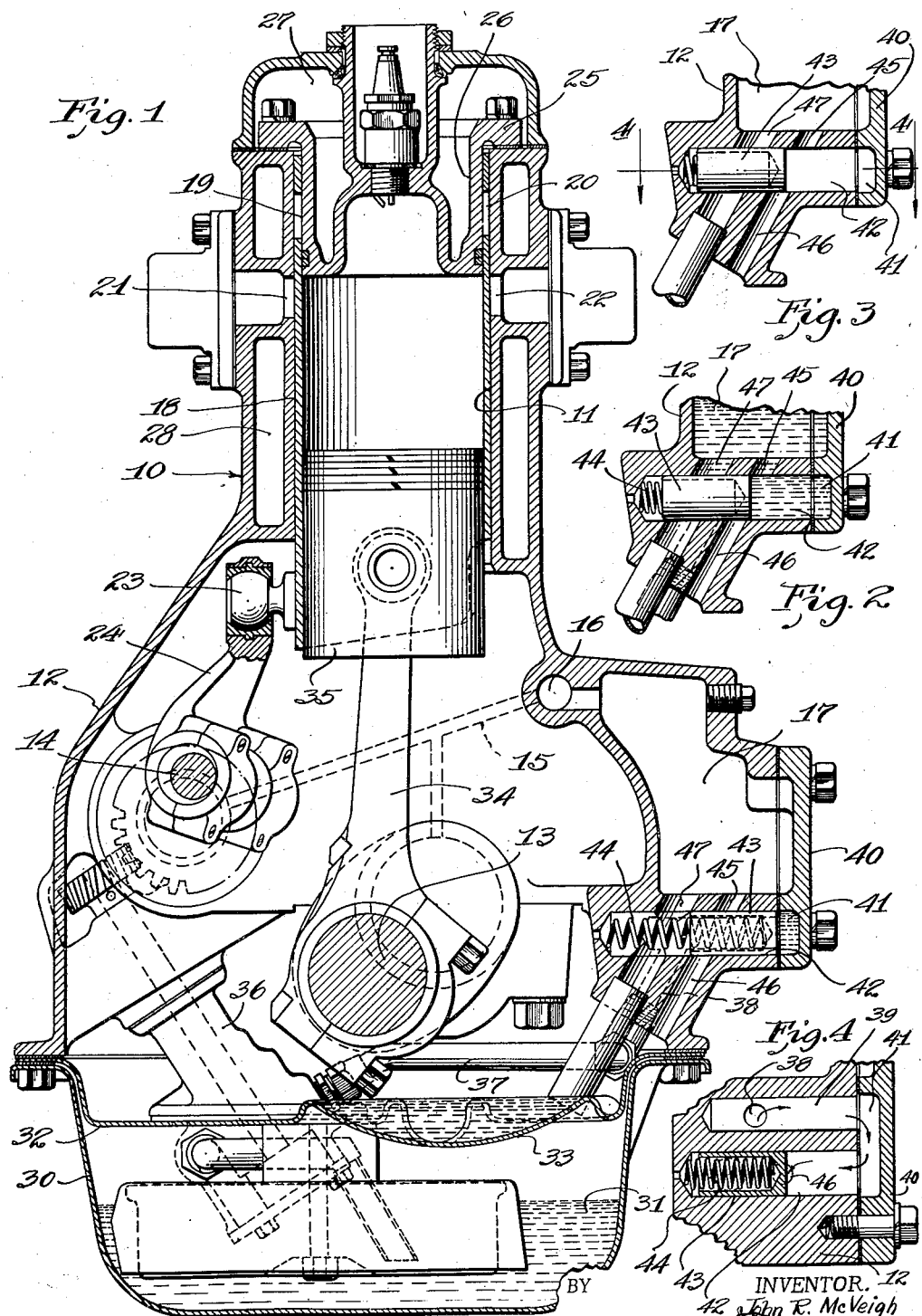
INVENTOR.
John R. McVeigh
W. W. Harris
ATTORNEY.

Patented Jan. 8, 1935

1,987,303

UNITED STATES PATENT OFFICE 1,987,303

ENGINE

John R. McVeigh, Detroit, Mich., assignor to Continental Motors Corporation, Detroit, Mich., a corporation of Virginia Application June 1, 1931, Serial No. 541,151

14 Claims. (Cl. 184—6)

My invention relates to engines and more particularly to an engine lubricating system especially adapted for use with a splash lubricating device preferably employed with engines of the sleeve valve type.

It is the object of my invention to provide an automatically controlled valve device for the lubricating system of an internal combustion engine which may be economically constructed and arranged for ready assembly or disassembly with the engine structure.

A further object of my invention is to provide a multiple purpose valve structure for the lubricating system of an internal combustion engine and which may be automatically operated in response to lubricant pressure for placing the lubricating system in communication with the source of lubricant pressure supply and for further actuation in response to excess lubricant placed within the system for relieving said excess pressure.

A still further object of my invention is to provide a more efficient automatic control for a lubricating system of an internal combustion engine employing a splash lubricating device for lubricating engine elements during the initial operation of the engine by providing a valve structure adapted for automatically controlling the distribution of lubricant and for relieving excess lubricant pressure within the lubricating system.

For a more detailed understanding of my invention, reference may be had to the accompanying drawing which illustrates one form which my invention may assume, and in which:

Figure 1 is a transverse sectional view through an internal combustion engine of the sleeve valve type illustrating a lubricating system and an associated automatic valve actuated mechanism constructed in accordance with the principle of my invention, Figure 2 is a fragmentary sectional view of the valve mechanism illustrating a position of the valve during normal operating conditions, Figure 3 is a similar fragmentary sectional view illustrating the principle of the valve when subjected to an excess lubricant pressure within the lubricating system, and Figure 4 is a fragmentary sectional view taken on the line 4—4 of Figure 3.

I have chosen for purpose of illustration to show my invention incorporated with an engine of the sleeve valve type which in general consists of an engine casting 10 providing a plurality of cylinders 11 and crankcase structure 12. The crankcase structure is adapted to support in suitable bearings a crankshaft 13 and a valve shaft 14, said structure being additionally provided with passages 15 for conducting lubricant to engine parts to be lubricated from the lubricant header 16, said header being in open communication with a lubricant reservoir 17. A sleeve valve means 18 operating within the cylinder 11 is provided with intake and exhaust ports 19 and 20 adapted for cooperative relation with the cylinder intake and exhaust ports 21 and 22 respectively. The valve-shaft 14 preferably consists of a wobbleshaft and is connected to a sleeve driving lug 23 carried by the sleeve valve means by the arm 24. This wobble shaft or valve shaft 14 is constructed to impart a combined reciprocating and oscillating movement to the sleeve valve means with respect to the cylinder and sleeve axes so that any point on said sleeve traverses a closed path. I preferably provide a cylinder head 25 having a portion 26 depending within the cylinder and spaced therefrom to provide a sleeve pocket for receiving the upper end of said sleeve valve means. Preferably the cylinder head and cylinders are provided with suitable jackets 27 and 28 respectively through which a cooling medium may be circulated.

A lubricant or oil pan 30 is secured to the underside of the crankcase structure and is adapted to store a quantity of lubricant 31. A splash pan 32 is supported by the crankcase and preferably depends within the lubricant pan 30, said splash pan being provided with depressions 33 through which the connecting rods 34 may pass on operating the engine, said connecting rods being constructed to connect the pistons 35 with the crankshaft 13. An oil pump 36 is supported within the engine structure and is preferably provided with an inlet communicating with the lubricant within the pan 30, the pressure side of said pump being connected to a conduit or pipe 37 which in turn is connected with a passage 38 within the crankcase structure. This passage 38 connects with a horizontal extending passage 39 and a cover 40 is secured to the crankcase structure for closing the open end of the reservoir and the open end of said passage 39, said cover being provided with a cored passage 41 for connecting the open end of the passage 39 with the open end of the parallel passage 42. This passage or bore 42 is constructed to slidably support a plunger valve 43, said valve being urged outwardly by the spring 44. During normal inoperative positions of the engine the valve 43 is located in a position as shown in Figure 1, but immediately on starting the engine the pump builds up a lubricant pressure within the conduit 37 and passages 38, 39 and 41, this pressure causing the plunger valve to move into a position as shown in Figure 2 which uncovers a port or passage 45, thereby placing the passage 42 in communication with the reservoir and permitting the circulation of lubricant through the lubricating system of the engine.

If for any reason the lubricant pressure within the lubricating system of the engine becomes excessive, the excess pressure causes the plunger valve 43 to be further actuated and to assume the position as shown in Figure 3 which will uncover the passage 46 opening into the passage 42. Thus any excess pressure in the system will be relieved through the passage 46 which lies in open communication with the interior of the engine crankcase.

On stopping the engine, the pressure of the lubricant in the lubricating system rapidly falls and the spring 44 is then permitted to function and to return the valve to the normal inoperative position illustrated in Figure 1. When the lubricant pressure thus falls the plunger uncovers the outlet opening 47 of the reservoir 17 and permits the contents of said reservoir to be dumped into the splash pan 32. Thus when the engine is again started the connecting rod passes through the depressions 33 which are filled with lubricant and splashes said lubricant on to the engine parts to be lubricated. At the same time the plunger type valve 43 is advanced into the position shown in Figure 2 as above described which closes the outlet port 47 and permits only a limited amount of lubricant to be splashed during the initial operation of the engine. The lubricant is again dumped into the splash pan when the engine stops permitting the splash to be repeated.

It will be noted that the device which I have described above may be very economically manufactured and can be readily assembled or disassembled with the engine structure because of the fact that ready access may be had to all moving parts of the valve mechanism on removing the cover 40. It may be further noted that the valve mechanism as described above is utilized for automatically controlling the distribution of the lubricant in a manner which supplies adequate lubrication to the engine at all times and which also relieves excess lubricant pressure within the lubricating system.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a lubricating system for an internal combustion engine having parts to be lubricated by a splash system and including an engine casting having passages for conducting lubricant from a source of lubricant supply to other parts of the engine to be lubricated, said passages having an outlet port, a pump for circulating lubricant through said passages under pressure, a splash pan for storing lubricant to be splashed on the first mentioned engine parts, and valve means intermediate the pump and passages, said valve means actuated in response to pressure of the lubricant in the lubricating system for placing said passages in communication with the pump while the engine is operating, to close the communication between said passages and pump when the engine stops and to open the outlet port to drain a portion of the lubricant in said passages into said splash pan, and further actuated in response to an excess lubricant pressure in said system to relieve such excess pressure.

2. A lubricating system for engines having a crankcase for storing a supply of lubricant, a splash pan, and means responsive to the lubricant pressure in said system for replenishing the supply of lubricant in said splash pan when a predetermined minimum pressure is reached in said system and for acting to relieve said system of excess pressure when a predetermined maximum pressure is reached in said system.

3. A lubricating system for engines having a crankcase for storing a supply of lubricant, a splash pan, and means responsive to the lubricant pressure in said system for replenishing the supply of lubricant in said splash pan when a predetermined minimum pressure is reached in said system and for acting to relieve said system of excess pressure when a predetermined maximum pressure is reached in said system, and dump said excess lubricant into said crankcase.

4. A lubricating system for an internal combustion engine and including a crankcase adapted for storing a supply of lubricant, a splash pan supported therein, a lubricant reservoir having an outlet communicating with said splash pan and communicating with the engine parts to be lubricated, means feeding lubricant to said reservoir under pressure, and valve means associated with the reservoir outlet and actuated in response to a fall of pressure in said reservoir whereby to permit the contents of said reservoir to drain into said splash pan when the engine stops, said valve means further actuated in response to an excess lubricant pressure in said system to relieve such excess pressure.

5. A lubricating system for engines including a crankcase adapted for storing a supply of lubricant, a splash pan, means circulating lubricant through said lubricating system under pressure, and means including a valve for draining a portion of said lubricant from said system into said splash pan on stopping the engine, said valve actuated in response to an excess lubricant pressure in said system to relieve such excess pressure.

6. In an engine lubricating system, a splash pan adapted for storing lubricant to be splashed on engine parts to be lubricated during the initial operation of the engine, and means refilling said splash pan with lubricant on stopping the engine, said means being further actuated in response to an excess lubricant pressure in the lubricating system to relieve such excess pressure.

7. A lubricating system for an internal combustion engine and including a crankcase adapted for storing a supply of lubricant, a splash pan, means circulating lubricant through said lubricating system under pressure, and including a pump, valve means intermediate said pump and system actuated in response to a rise in pressure on the pressure side of said pump to place said system in communication with the pump, said system having an outlet in communication with said splash pan, and said valve means actuated in response to a predetermined pressure fall in said lubricating system to drain a portion of said lubricant into said splash pan, and further actuated in response to an excess lubricant pressure in the lubricating system to relieve such excess pressure.

8. A lubricating system for an internal combustion engine and including a crankcase adapted for storing a supply of lubricant, a splash pan, means circulating lubricant through said lubricating system under pressure, and including a pump, said system having an inlet and outlet communicating respectively with the pump and splash pan, and valve means for said inlet and outlet actuated in response to pressure within said lubricating system to drain a portion of said lubricant into the splash pan on stopping the engine, said system having an auxiliary outlet, said valve means further actuated in response to an excess lubricant pressure in the lubricating system to open said auxiliary outlet and relieve such excess pressure.

9. In an engine of the sleeve valve type having a cylinder and associated sleeve valve means relatively movable within the cylinder, a lubricating system including a crankcase adapted for storing a supply of lubricant, a splash pan, means circulating lubricant through the lubricating system under pressure, and means for introducing a predetermined amount of lubricant into said splash pan on stopping the engine, whereby to splash lubricant on said sleeve valve means during the initial operation of the engine, said last mentioned means further actuated in response to an excess lubricant pressure in the lubricating system to relieve such excess pressure and return lubricant to the engine crankcase.

10. A sleeve valve engine having a cylinder and associated sleeve valve, means for operating said sleeve valve and imparting thereto a combined reciprocating and oscillating movement with respect to the sleeve and cylinder axes, a crankshaft and associated piston, a lubricating system therefor including a crankcase for storing a supply of lubricant and means for circulating lubricant through said system under pressure, a splash pan underlying said crankshaft and adapted for storing lubricant during idle periods of the engine for use in lubricating moving parts of the engine during initial operation of the engine, and means responsive to the fall of pressure in said lubricating system for replenishing said splash pan with lubricant when the engine stops, said means further actuated in response to an excess lubricant pressure in said system to relieve such pressure and return lubricant to the engine crankcase.

11. In an engine lubricating system, a crankcase for storing a supply of lubricant, a splash pan adapted for storing lubricant to be splashed on engine parts to be lubricated during the initial operation of the engine, said system including lubricant passages respectively connecting said system with the crankcase and splash pan, and valve means responsive to the lubricant pressure in said system for opening the passage associated with said splash pan when a predetermined minimum lubricant pressure is reached in said system and for opening the passage connecting the system with the crankcase when a predetermined maximum pressure is reached in said system.

12. In an engine lubricating system, a crankcase for storing a supply of lubricant, a splash pan adapted for storing lubricant to be splashed on engine parts to be lubricated during the initial operation of the engine, and means responsive to the lubricant pressure in said system for replenishing the supply of lubricant in said splash pan on stopping the engine and for relieving the pressure in said system when a predetermined maximum pressure is reached in said system.

13. In an engine lubricating system, a crankcase for storing a supply of lubricant, a splash pan adapted for storing lubricant to be splashed on engine parts to be lubricated during the initial operation of the engine, and valve means actuated in response to pressure variations in said lubricating system for replenishing the supply of lubricant in said splash pan when a predetermined minimum pressure is reached in said system, and for relieving the lubricant pressure in said system when a predetermined maximum pressure is reached in the lubricating system.

14. In an engine lubricating system, a crankcase for storing a supply of lubricant, a splash pan adapted for storing lubricant to be splashed on engine parts to be lubricated during the initial operation of the engine, and valve means actuated in response to pressure variations in said lubricating system for replenishing the supply of lubricant in said splash pan when a predetermined minimum pressure is reached in said system and for draining an excess of lubricant from said system to the engine crankcase when a predetermined maximum pressure is reached in the lubricating system.

JOHN R. McVEIGH.